(12) United States Patent
Smolyansky et al.

(10) Patent No.: US 11,608,073 B2
(45) Date of Patent: Mar. 21, 2023

(54) SECURE SYSTEM THAT INCLUDES DRIVING RELATED SYSTEMS

(71) Applicant: Mobileye Vision Technologies Ltd., Jerusalem (IL)

(72) Inventors: Leonid Smolyansky, Zichron Ya'akov (IL); Yosi Arbeli, Rishon Le-Zion (IL); Elchanan Rushinek, Neve Yarak (IL); Shmuel Cohen, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 16/605,658

(22) PCT Filed: Apr. 17, 2018

(86) PCT No.: PCT/IL2018/050432
§ 371 (c)(1),
(2) Date: Oct. 16, 2019

(87) PCT Pub. No.: WO2018/193449
PCT Pub. Date: Oct. 25, 2018

(65) Prior Publication Data
US 2020/0039530 A1 Feb. 6, 2020

Related U.S. Application Data

(60) Provisional application No. 62/486,008, filed on Apr. 17, 2017.

(51) Int. Cl.
*B60W 50/02* (2012.01)
*B60W 50/023* (2012.01)
(Continued)

(52) U.S. Cl.
CPC ...... *B60W 50/0205* (2013.01); *B60W 50/023* (2013.01); *B60W 50/0225* (2013.01);
(Continued)

(58) Field of Classification Search
CPC .......... B60W 50/0205; B60W 50/023; B60W 50/0225; B60W 2050/021; G07C 5/02; G07C 5/08
See application file for complete search history.

(56) References Cited

U.S. PATENT DOCUMENTS 6,897,629 B2 * 5/2005 Wilton ................. B60L 3/0061
318/139
8,878,542 B2 * 11/2014 Bruckhaus ............ B60L 3/0069
324/500

(Continued)

FOREIGN PATENT DOCUMENTS

CN 110799404 A 2/2020
EP 1616746 A2 1/2006
(Continued)

OTHER PUBLICATIONS

"Korean Application Serial No. 10-2019-7033849, Voluntary Amendment filed Nov. 15, 2019", w English claims, voluntary amendment filed with PPH Request and Exam Request at time of filing., 14 pgs.
(Continued)

*Primary Examiner* — Thomas Ingram
(74) *Attorney, Agent, or Firm* — Schwegman Lundberg & Woessner, P.A.

(57) ABSTRACT

A system that may include multiple driving related systems that are configured to perform driving related operations; a selection module; multiple fault collection and management units that are configured to monitor statuses of the multiple driving related systems and to report, to the selection module, at least one out of (a) an occurrence of at least one critical fault, (b) an absence of at least one critical fault, (c) an occurrence of at least one non-critical fault, and (d) an absence of at least one non-critical fault; and wherein the selection module is configured to respond to the report by performing at least one out of: (i) reset at least one entity out
(Continued)

of the multiple fault collection and management units and the multiple driving related systems; and (ii) select data outputted from a driving related systems.

27 Claims, 14 Drawing Sheets

(51) Int. Cl.
    *G07C 5/02*         (2006.01)
    *G07C 5/08*         (2006.01)
(52) U.S. Cl.
    CPC .............. *G07C 5/02* (2013.01); *G07C 5/08* (2013.01); *B60W 2050/021* (2013.01); *B60W 2420/42* (2013.01)

(56) References Cited

U.S. PATENT DOCUMENTS

| | | | |
|---|---|---|---|
| 9,449,436 | B2 * | 9/2016 | Seufert .................. F16H 61/12 |
| 9,489,340 | B2 * | 11/2016 | Safa-Bakhsh ........... G06F 17/00 |
| 10,120,374 | B2 * | 11/2018 | Hosek ................ G05B 23/0221 |
| 2004/0162650 | A1 | 8/2004 | Kueperkoch et al. |
| 2007/0149349 | A1 * | 6/2007 | Utsumi ................ B60W 20/50 |
| | | | 73/114.73 |
| 2012/0159241 | A1 * | 6/2012 | Nishijima ........... G06F 11/1423 |
| | | | 714/11 |
| 2013/0246866 | A1 | 9/2013 | Costin et al. |
| 2014/0052326 | A1 | 2/2014 | Seufert et al. |
| 2014/0257624 | A1 | 9/2014 | Safa-bakhsh et al. |
| 2015/0346717 | A1 | 12/2015 | Hosek et al. |
| 2016/0200421 | A1 | 7/2016 | Morrison |

FOREIGN PATENT DOCUMENTS

| | | |
|---|---|---|
| JP | H06174599 A | 6/1994 |
| JP | 2001243591 A | 9/2001 |
| JP | 2001339412 A | 12/2001 |
| JP | 2007253704 A | 10/2007 |
| JP | 2013196084 A | 9/2013 |
| JP | 2015510699 A | 4/2015 |
| JP | 2016540668 | 12/2016 |
| KR | 20130119452 | 10/2013 |
| KR | 102263828 B1 | 6/2021 |
| WO | 2016169856 | 10/2016 |
| WO | WO-2018193449 A1 | 10/2018 |

OTHER PUBLICATIONS

"Japanese Application Serial No. 2019-556656, Voluntary Amendment filed Nov. 28, 2019", w English claims, 9 pgs.
"Korean Application Serial No. 10-2019-7033849, Notice of Preliminary Rejection dated Feb. 3, 2020", w English Translation, 11 pgs.
"A Primer on Architectural Level Fault Tolerance", [Online] Retrieved from the Internet: <https://pdfs.semanticscholar.org/ce36/9d5fb24cc48c6e5253cb01dd9d34e590ee9e.pdf>, (Feb. 1, 2008), 53 pgs.
"International Application Serial No. PCT/IL2018/050432, International Search Report dated Jul. 12, 2018", 4 pgs.
"International Application Serial No. PCT/IL2018/050432, Written Opinion dated Jul. 12, 2018", 6 pgs.
"Chinese Application Serial No. 201880025484.1, Office Action dated Sep. 4, 2020", w/English translation, 13 pgs.
"Chinese Application Serial No. 201880025484.1, Voluntary Amendment filed Apr. 17, 2020", w/English claims, 11 pgs.
"European Application Serial No. 18725924.7, Communication Pursuant to Article 94(3) EPC dated Apr. 7, 2020", 6 pgs.
"Japanese Application Serial No. 2019-556656, Notification of Reasons for Refusal dated Jul. 7, 2020", w/English Translation, 10 pgs.
"Korean Application Serial No. 10-2019-7033849, Final Office Action dated Aug. 10, 2020", w/English machine translation, 5 pgs.
"Korean Application Serial No. 10-2019-7033849, Response filed Apr. 29, 2020 to Notice of Preliminary Rejection dated Feb. 3, 2020", w/ English claims, 16 pgs.
"Korean Application Serial No. 10-2019-7033849, Appeal Brief filed Jan. 19, 2021 to Final Office Action dated Nov. 13, 2020", w current English claims, claims not amended in appeal brief, a notice of appeal was filed Dec. 16, 2020, 1 didn't know if that should be included here., 19 pgs.
"European Application Serial No. 18725924.7, Response filed Feb. 11, 2021 to Communication Pursuant to Article 94(3) EPC dated Oct. 13, 2020", 5 pgs.
"Chinese Application Serial No. 201880025484.1, Response filed Jan. 15, 2021 to Office Action dated Sep. 4, 2020", w/ English Claims, 13 pgs.
"Japanese Application Serial No. 2019-556656, Notification of Reasons for Refusal dated Jan. 5, 2021", w/ English Translation, 6 pgs.
"European Application Serial No. 18725924.7, Communication Pursuant to Article 94(3) EPC dated Oct. 13, 2020", 5 pgs.
"European Application Serial No. 18725924.7, Result of Examiner Consultation dated Nov. 20, 2020", Official summary of examiner telephone consultation, 3 pgs.
"Japanese Application Serial No. 2019-556656, Response filed Oct. 7, 2020 to Notification of Reasons for Refusal dated Jul. 7, 2020", w/ English claims, 13 pgs.
"Korean Application Serial No. 10-2019-7033849, Final Office Action dated Nov. 13, 2020", w/ English Translation, 6 pgs.
"Korean Application Serial No. 10-2019-7033849, Request for Reexam filed Oct. 12, 2020 to Final Office Action dated Aug. 10, 2020", w/ English claims, 19 pgs.
"Chinese Application Serial No. 201880025484.1, Decision of Rejection dated Nov. 2, 2021", w/ English Translation, 13 pgs.
"Chinese Application Serial No. 201880025484.1, Response filed Sep. 23, 2021 to Office Action dated Jul. 23, 2021", w/ English claims, 10 pgs.
"European Application Serial No. 18725924.7, Response filed Jun. 2, 2022 to Summons to Attend Oral Proceedings dated Aug. 11, 2021", 45 pgs.
"Japanese Application Serial No. 2019-556656, Examiners Decision of Final Refusal mailed Dec. 7, 2021", w/ English Translation, 14 pgs.
"Japanese Application Serial No. 2019-556656, Response filed Apr. 6, 2022 to Examiners Decision of Final Refusal dated Dec. 7, 2021", w/ English claims, 18 pgs.
"Japanese Application Serial No. 2019-556656, Response filed Sep. 14, 2021 to Notification of Reasons for Refusal dated Jun. 15, 2021", w/ English claims, 12 pgs.
"Chinese Application Serial No. 201880025484.1, Office Action dated Mar. 24, 2021", w/ English Translation, 15 pgs.
"Chinese Application Serial No. 201880025484.1, Office Action dated Jul. 23, 2021", w/ English Translation, 10 pgs.
"Chinese Application Serial No. 201880025484.1, Response filed Jun. 3, 2021 to Office Action dated Mar. 24, 2021", w/ English claims, 15 pgs.
"European Application Serial No. 18725924.7, Summons to Attend Oral Proceedings dated Apr. 20, 2021", 4 pgs.
"European Application Serial No. 18725924.7, Summons to Attend Oral Proceedings dated Aug. 11, 2021", 4 pgs.
"Japanese Application Serial No. 2019-556656, Notification of Reasons for Refusal dated Jun. 15, 2021", w/ English Translation, 12 pgs.
"Japanese Application Serial No. 2019-556656, Response filed Mar. 29, 2021 to Notification of Reasons for Refusal dated Jan. 5, 2021", w/ English claims, 11 pgs.
"Japanese Application Serial No. 2019-556656, Notification of Reasons for Refusal dated Jan. 4, 2023", w English Translation, 20 pgs.

\* cited by examiner

SECURE SYSTEM THAT INCLUDES DRIVING RELATED SYSTEMS

CROSS REFERENCE

This application is a U.S. National Stage Application under 35 U.S.C. 371 from International Application No. PCT/IL2018/050432, filed Apr. 17, 2018, which claims priority from U.S. provisional Ser. No. 62/248,6008, patent filing date Apr. 17, 2017, which are incorporated herein in by reference.

BACKGROUND

There is a need to comply with increasing Automotive Safety Integrity Levels (ASIL)—especially ASIL B and ASIL D levels and to comply with standard ISO 26262.

ASIL refers to an abstract classification of inherent safety risk in an automotive system or elements of such a system. ASIL classifications are used within ISO 26262 to express the level of risk reduction required to prevent a specific hazard, with ASIL D representing the highest and ASIL A the lowest. The ASIL assessed for a given hazard is then assigned to the safety goal set to address that hazard and is then inherited by the safety requirements derived from that goal (see: www.wikipedia.org)

There is a need to provide a system that is safer than some of its components—and especially to achieve a certain ASIL by using a system on Chip (Soc) of an inherently lower ASIL level. For example—an ASIL-B SoC should enable to reach ASIL-D on a System level, at reduced System cost.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as FCW, LDW and TSR, as opposed to fully autonomous driving.

There may be provided a system that may include multiple driving related systems that are configured to perform driving related operations; a selection module; multiple fault collection and management units that are configured to monitor statuses of the multiple driving related systems and to report, to the selection module, at least one out of (a) an occurrence of at least one critical fault, (b) an absence of at least one critical fault, (c) an occurrence of at least one non-critical fault, and (d) an absence of at least one non-critical fault; wherein the selection module is configured to respond to the report by performing at least one out of: (i) reset at least one entity out of the multiple fault collection and management units and the multiple driving related systems; and (ii) select data outputted from a driving related systems.

There may be provided a method for securing a system, the method may include performing, by multiple driving related systems, driving related operations; monitoring, by multiple fault collection and management units, statuses of the multiple driving related systems; reporting, to a selection module, at least one out of (a) an occurrence of at least one critical fault, (b) an absence of at least one critical fault, (c) an occurrence of at least one non-critical fault, and (d) an absence of at least one non-critical fault; responding, by the selection module, to the report by performing at least one out of (i) resetting at least one entity out of the multiple fault collection and management units and the multiple driving related systems; and (ii) selecting data outputted from a driving related systems.

There may be provided a computer program product that stores instructions for: performing, by multiple driving related systems, driving related operations; monitoring, by multiple fault collection and management units, statuses of the multiple driving related systems; reporting, to a selection module, at least one out of (a) an occurrence of at least one critical fault, (b) an absence of at least one critical fault, (c) an occurrence of at least one non-critical fault, and (d) an absence of at least one non-critical fault; responding, by the selection module, to the report by performing at least one out of (i) resetting at least one entity out of the multiple fault collection and management units and the multiple driving related systems; and (ii) selecting data outputted from a driving related systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
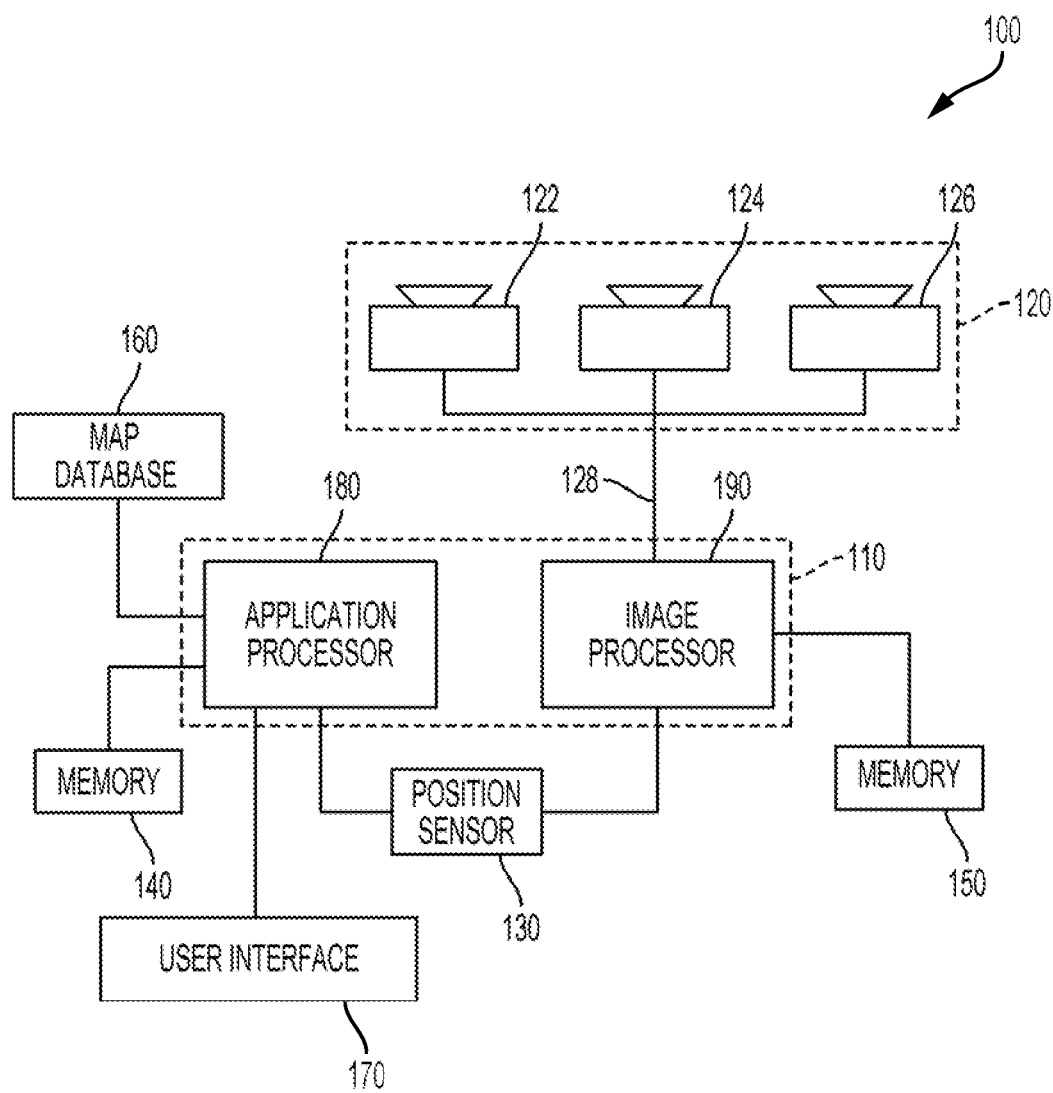
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™. and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor or any further generation chip, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120, or it can be combined with or otherwise compliment the image data from the image acquisition device 120, or some processed variation or derivative of the image data from the image acquisition device 120.

Figure 2A:
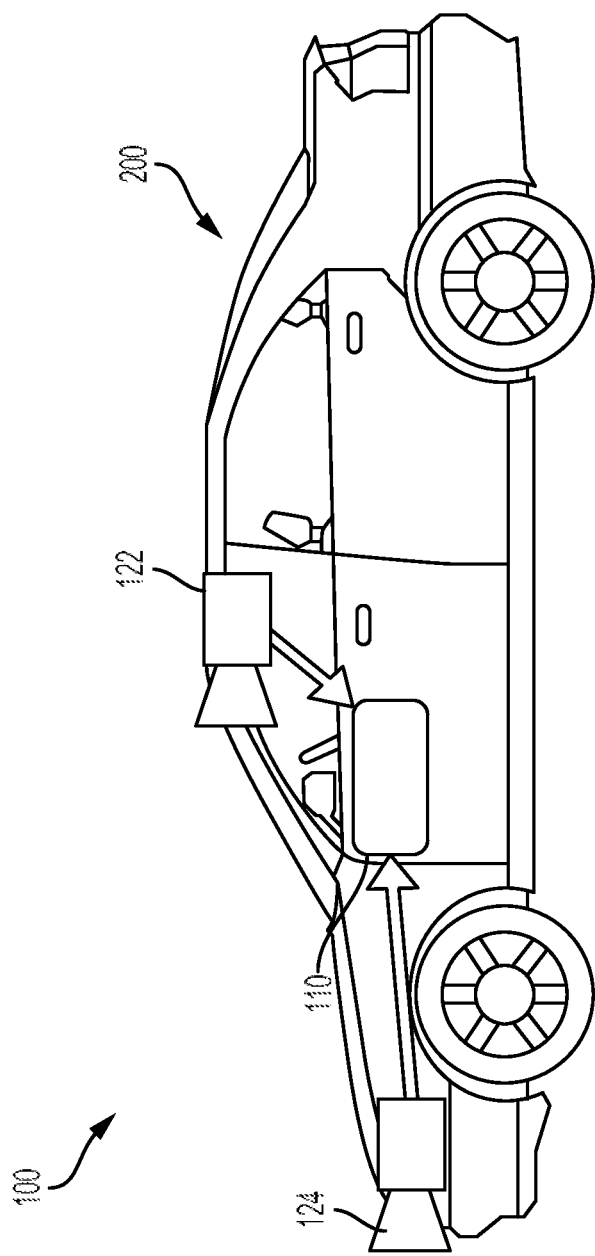
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
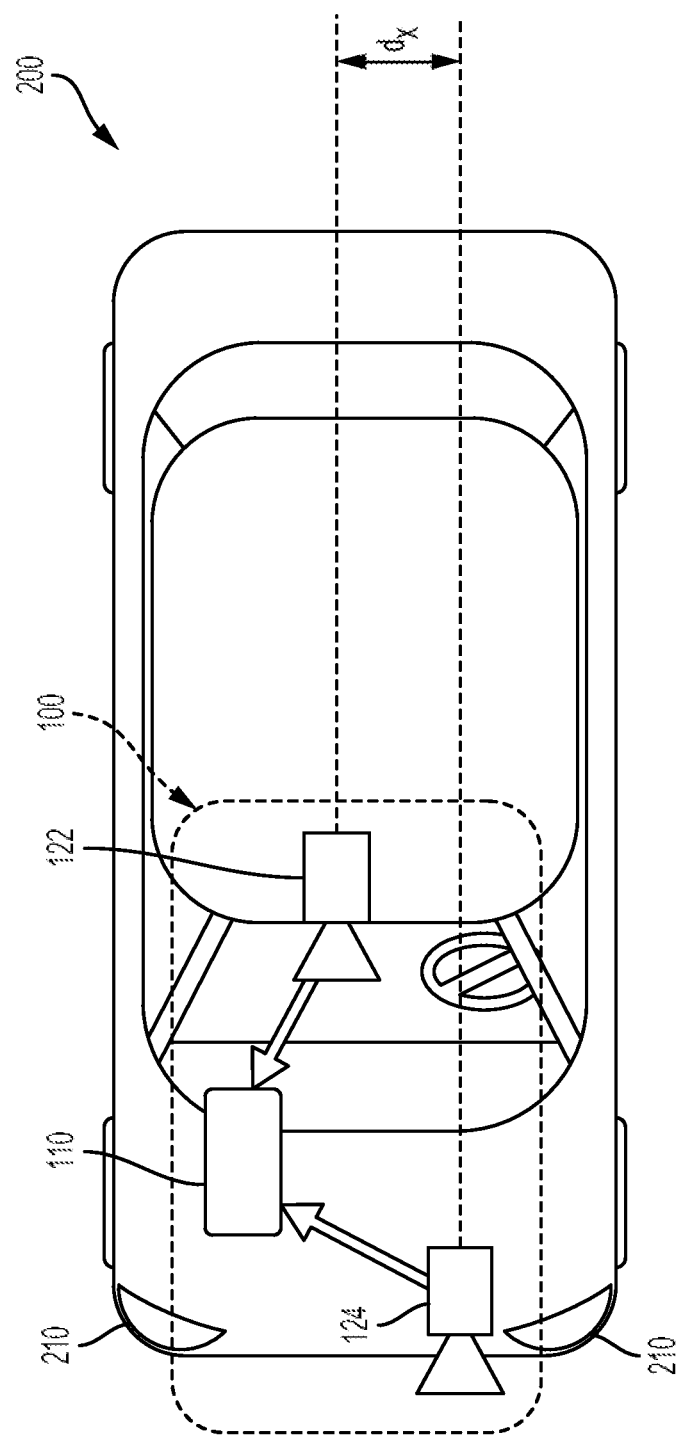
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
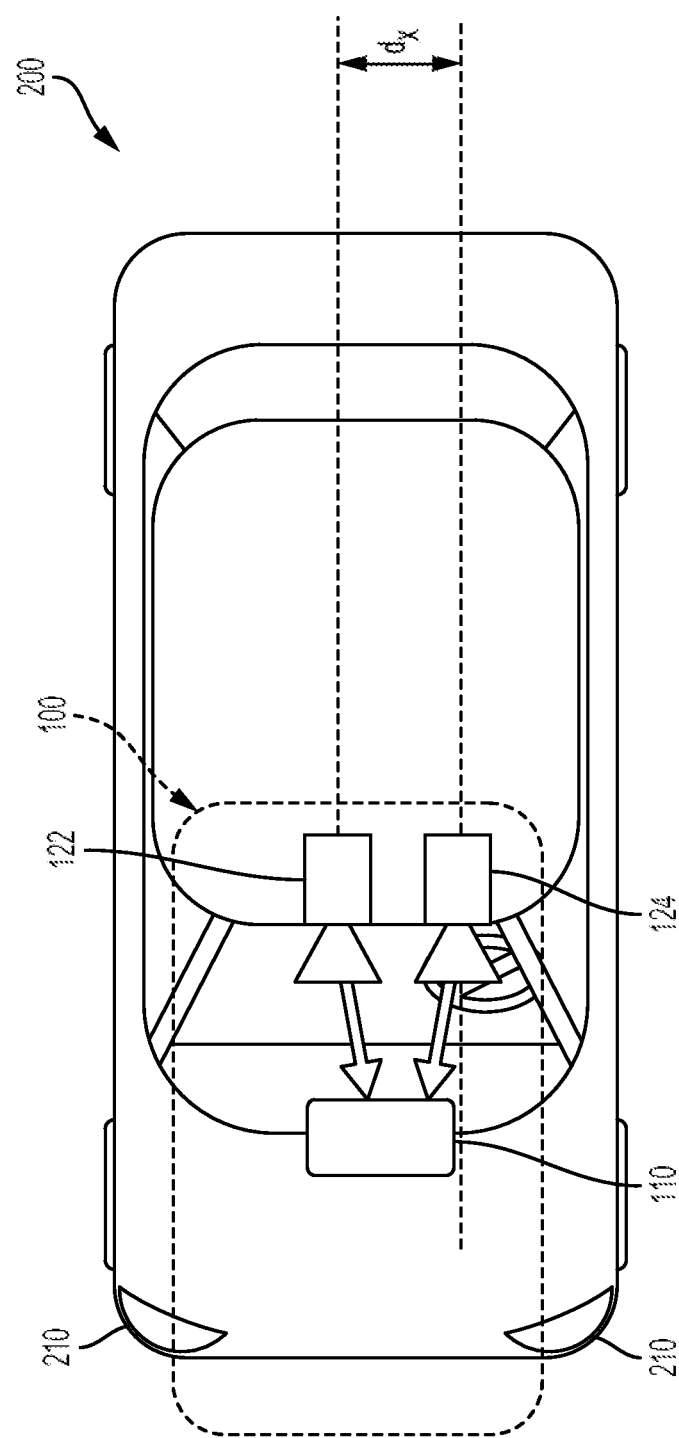
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
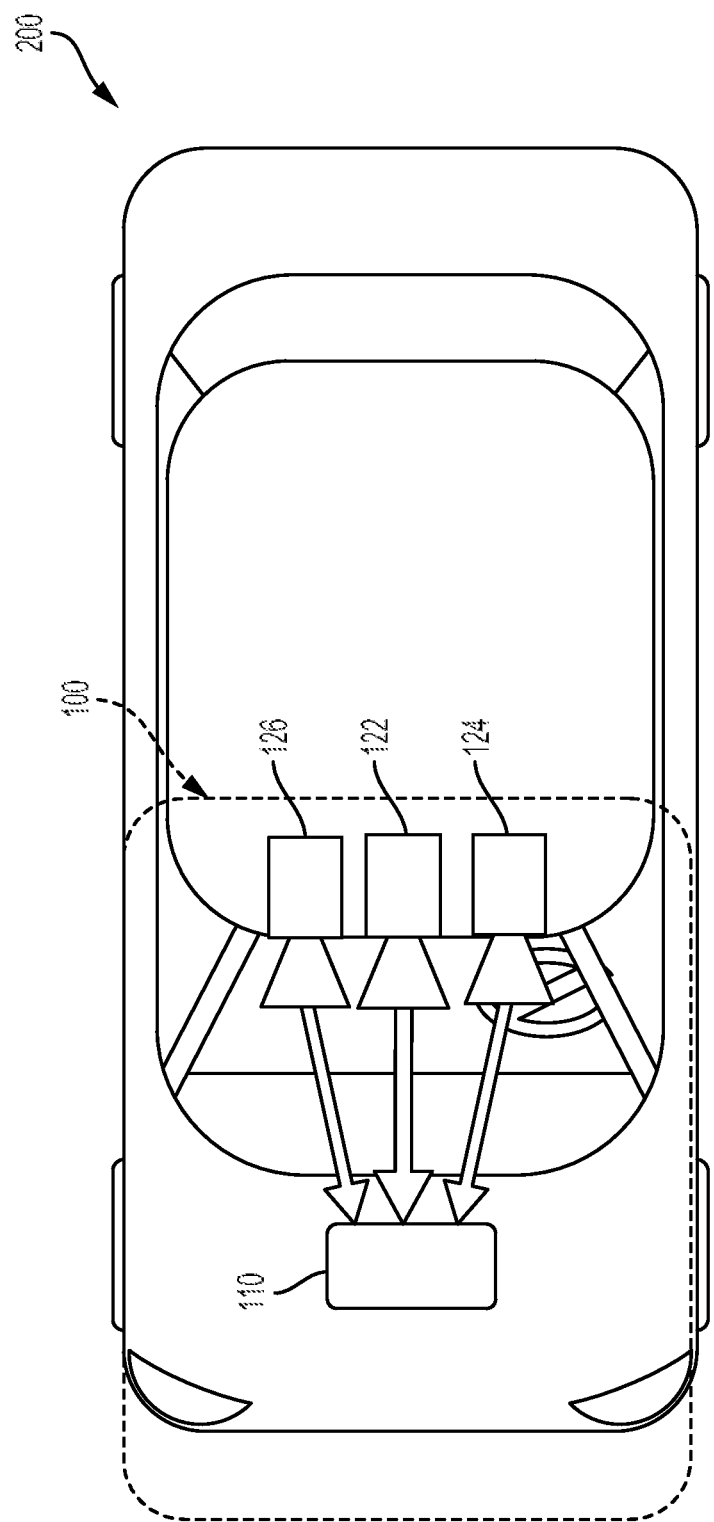
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
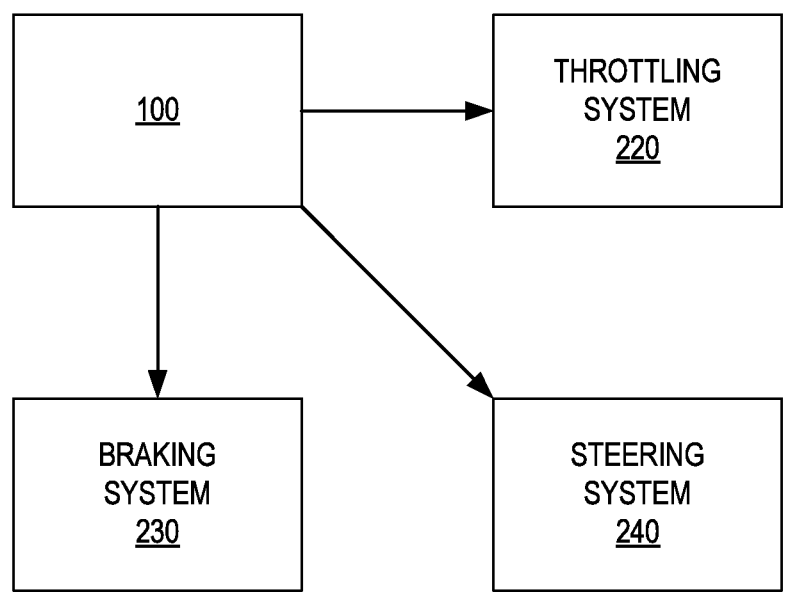
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
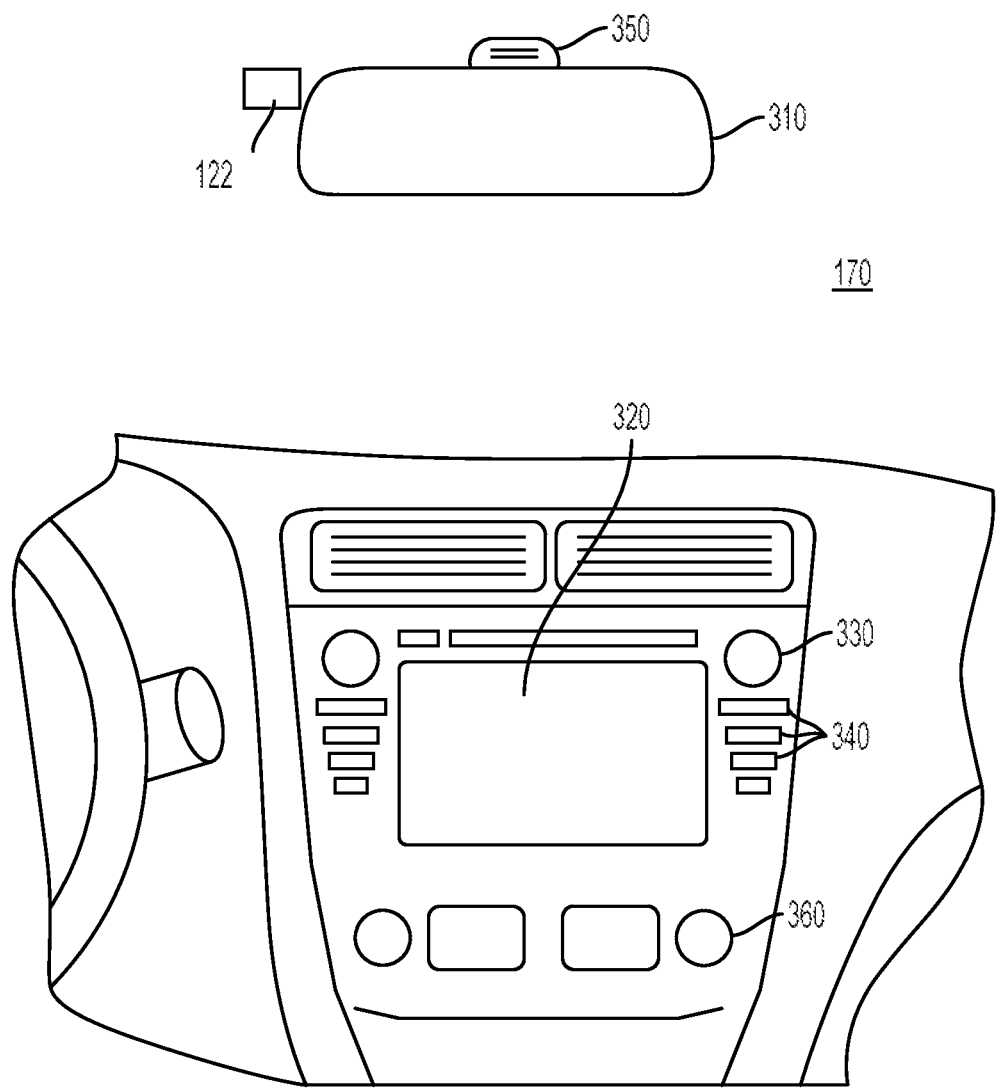
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Multi-Imaging System

As discussed above, system 100 may provide drive assist functionality or semi or fully autonomous driving functionality that uses a single or a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three-camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, one or more of image capture devices 122-126 may be mounted behind glare shield that is flush with the windshield of vehicle 200. Such shielding may act to minimize the impact of any reflections from inside the car on image capture devices 122-126.

In another embodiment, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three-camera system may provide certain performance characteristics. For example, some embodiments may include an ability to validate the detection of objects by one camera based on detection results from another camera. In the three-camera configuration discussed above, processing unit 110 may include, for example, three processing devices (e.g., three EyeQ series of processor chips, as discussed above), with each processing device dedicated to processing images captured by one or more of image capture devices 122-126.

In a three-camera system, a first processing device may receive images from both the main camera and the narrow field of view camera, and perform processing of the narrow FOV camera or even a cropped FOV of the camera. In some embodiments, the first processing device can be configured to use a trained system (e.g., a trained neural network) to detect objects and/or road features (commonly referred to as "road objects"), predict a vehicle's path, etc. ahead of a current location of a vehicle.

The first processing device can be further adapted to preform image processing tasks, for example, which can be intended to detect other vehicles, pedestrians, lane marks, traffic signs, traffic lights, and other road objects. Still further, the first processing device may calculate a disparity of pixels between the images from the main camera and the narrow camera and create a 3D reconstruction of the environment of vehicle 200. The first processing device may then combine the 3D reconstruction with 3D map data (e.g., a depth map) or with 3D information calculated based on information from another camera. In some embodiments, the first processing device can be configured to use the trained system on depth information (for example the 3D map data), in accordance with examples of the presently disclosed subject matter. In this implementation the system can be trained on depth information, such as 3D map data.

The second processing device may receive images from main camera and can be configured to perform vision processing to detect other vehicles, pedestrians, lane marks, traffic signs, traffic lights, road barriers, debris and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion-based 3D reconstruction to the first processing device to be combined with the stereo 3D images or with the depth information obtained by stereo processing.

The third processing device may receive images from the wide FOV camera and process the images to detect vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

As will be appreciated by a person skilled in the art having the benefit of this disclosure, numerous variations and/or modifications can be made to the foregoing disclosed examples. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 or alert a user of the vehicle in response to the analysis.

As discussed below in further detail and according to examples of the presently disclosed subject matter, system 100 may provide a variety of features related to autonomous driving, semi-autonomous driving, and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. Automatic actions can be carried out under human supervision and can be subject to human intervention and/or override. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 can analyze the collected data and issue warnings and/or alerts to vehicle occupants based on the analysis of the collected data.

There is provided a system that may include fault collection and management units. A fault collection and management unit (FCMU) may be included in a drive control/assistance system (hereinafter—driving related system) or may be coupled to a driving related system.

A driving related system is coupled to sensors and may perform various operations related to autonomous driving and/or operations for supporting a driver. For example, the driving related system may detect the environment of a vehicle, may detect obstacles, may control the driving of the vehicle, may handover control of the vehicle to a human driver, may provide alerts (or any type of indications) to a driver to a driver in relation to the environment of the vehicle, and the like.

A driving related module and/or a driving related system may include components such as but not limited to processing unit 110, memory units (such as memory 140 and/or memory 150) and a user interface 170.

Each driving related system may include one or more driving related modules. Each driving related module may include a chip, a system on chip (SOC), may include one or more chips and/or may include one or more SOCs. A non-limiting example of such a module is the EyeQ system on chip family (of any generation) of Mobileye, Israel. One or more driving related modules may be implemented in one or more SOCs.

The FCMU may be installed in each driving related module, in some of the driving related modules, and the like—either as a part of SOC or as a discrete entity.

In the following example it is assumed that each driving related system includes a single SOC that may be coupled to one or more other chips.

Figure 4:
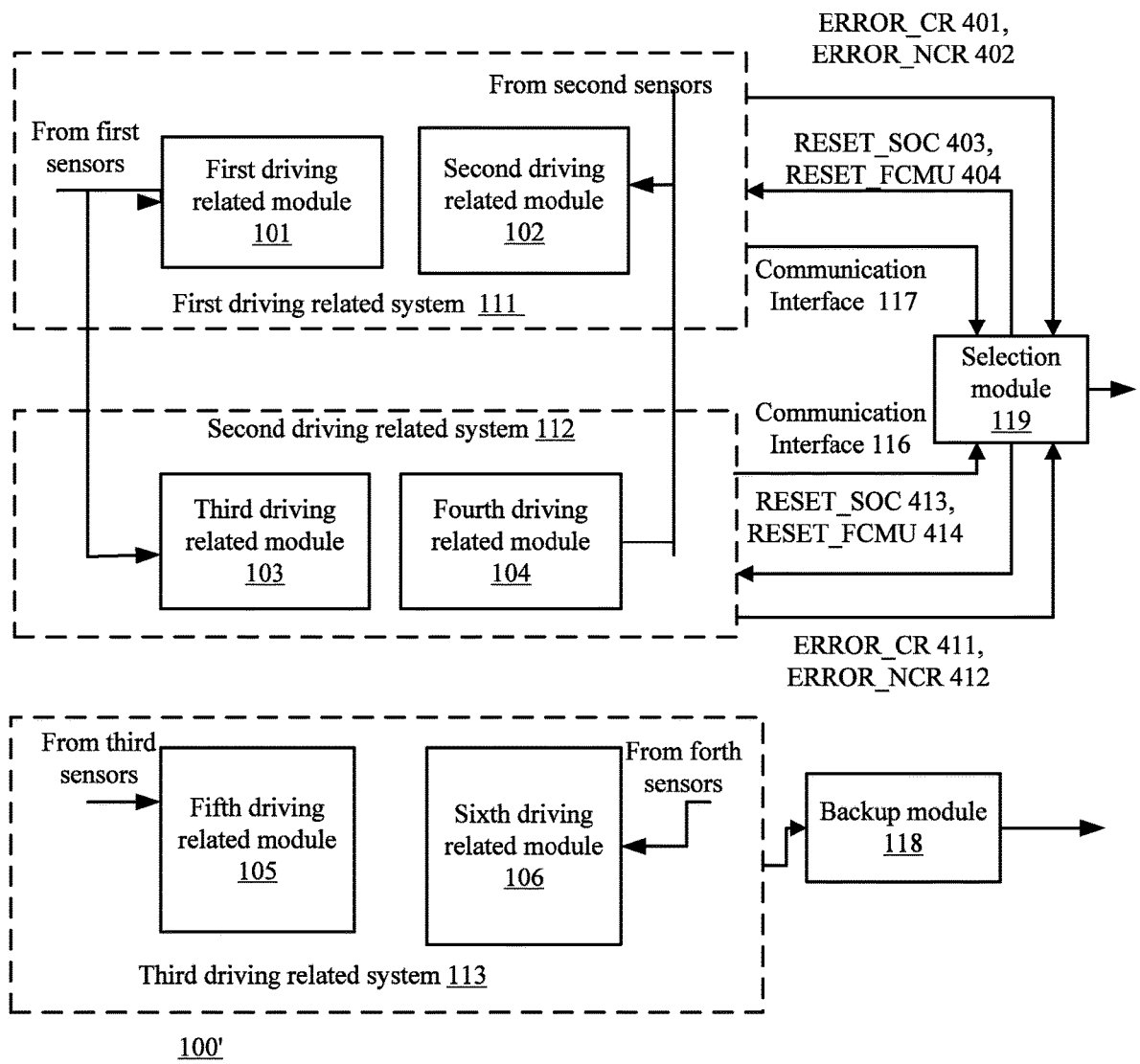
FIG. 4 illustrates an ADAS/AV system.

FIG. 4 illustrates an example of a system 100' of a high ASIL level (for example D level). System 100' includes multiple driving related systems and multiple driving related modules as well as a selection module and a backup module, according to embodiments of the present disclosure.

It is noted that the types and numbers of driving related modules, types and/or numbers of sensors, types and numbers of the selection module and backup module may differ from those illustrated in the drawings. For example—having three pairs of driving related modules (forming three driving related systems) is merely an example and any number of driving related modules (and driving related systems) may be provided. A driving related system may include one, three or more driving related modules.

System 100' may include:
1. A first driving related system 111 that includes a first pair of driving related modules. The first pair includes (i) first driving related module 101 that may receive and process information from first sensors, and (ii) second driving related module 102 that may receive and process information from second sensors. The first and/or second sensors may include any types of sensors such as radar, lidar, cameras, and the like.
2. A second driving related system that includes a second pair of driving related modules. The second pair includes (i) second driving related module 103 that may receive and process information from first sensors, and (ii) fourth driving related module 104 that may receive and process information from second sensors.
3. A selection module 119 is coupled to the first and second pairs of driving related modules and may select which pair to use. The selection may be based on status information and/or fault information provided by each pair. The fault information may be provided, at least in part, by the FCMU of each pair.
4. An additional driving related system such as third driving related system 113 that includes a third pair of driving related modules. The third pair may include (i) fifth driving related module 105 that may receive and process information from third sensors, as well as (ii) sixth driving related module 106 that may receive and process information from fourth sensors.

The third driving related system may be similar to the first and/or second driving related systems.

The third driving related system 113 may or may not include a FCMU.

The third driving related system is used as a backup in case the first and/or second pairs are malfunctioning. The third driving related system may have the same functionality as the first and second driving related systems. Alternatively—the third driving related system may have more limited functionality. By way of example, the third driving related system may be responsible for driving the car to safe area, notifying the driver and/or third party of a major failure and shutting the car after reaching the safe area. The safe area may be a parking lot or any location in which the car can be parked in a safe manner.

System 100' also includes one or more FCMUs—but they are not illustrated for simplicity of explanation.

Figure 5:
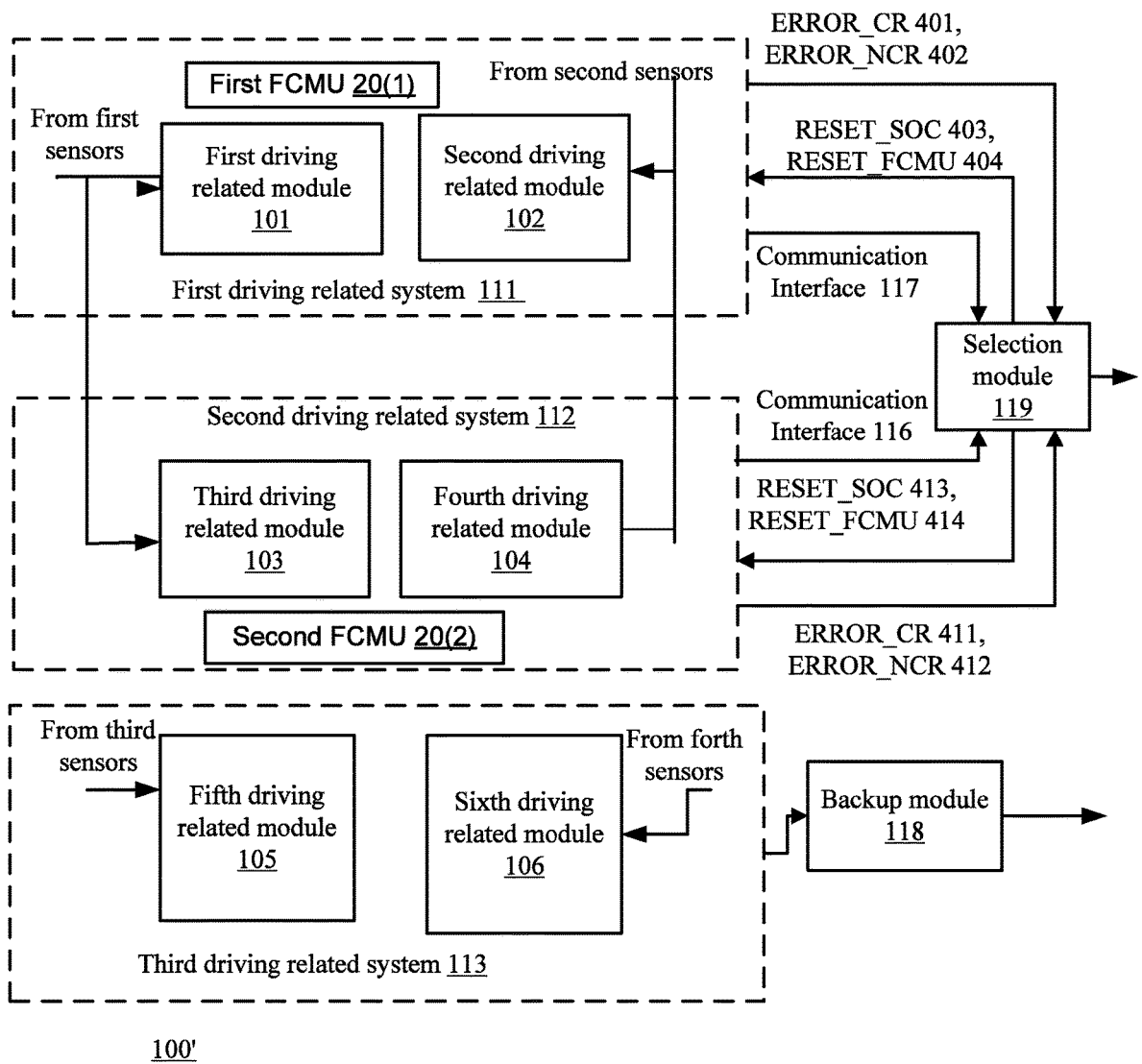
FIG. 5 illustrates an ADAS/AV system.

In FIG. 5 system 100' is illustrated as including first FCMU 20(1) and second FCMU 20(2) that are included in first and second driving related systems 111 and 112 respectively.

Figure 6:
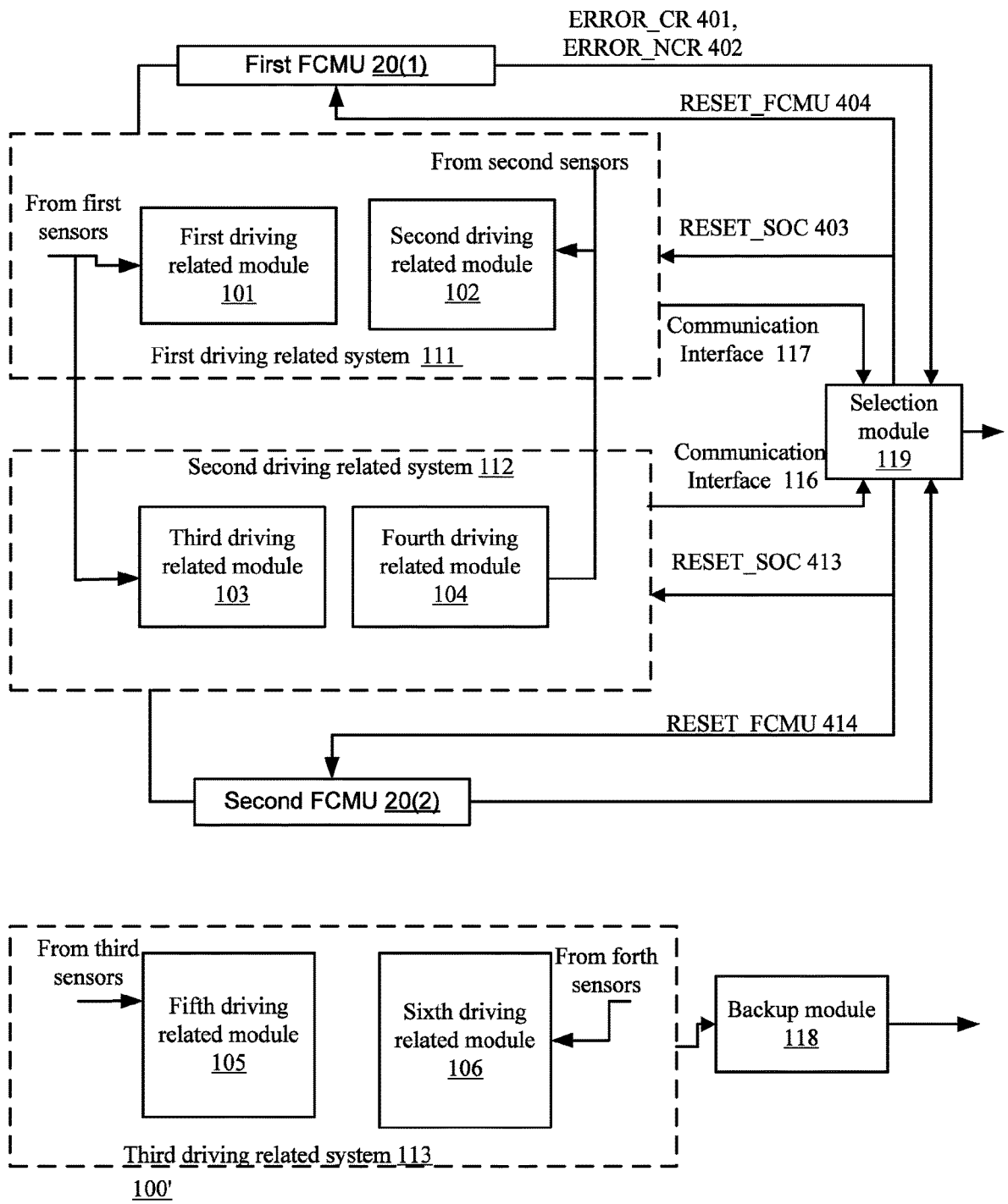
FIG. 6 illustrates an ADAS/AV system.

In FIG. 6, system 100' is illustrated as having first FCMU 20(1) and second FCMU 20(2) that are coupled to (but not included in) first and second driving related systems 111 and 112 respectively.

FIGS. 4-6 also illustrates examples of various signals 401-404 and 411-414 as well as and communication interfaces 116 and 117. Communication interfaces 116 and 117 that are coupled between selection module 119 and first and second driving related systems respectively—the communication interfaces 116 and 117 are used to exchange data and/or control signals that differ from signals 401-404 and 411-414. Signals 401-404 and 411-414 are examples of signals and include:
1. ERROR_CR 401—indicative of a critical error of first driving related system 111. This signal is sent from first driving related system 111 to selection module 119.
2. ERROR_NCR 402—indicative of a non-critical error of first driving related system 111. This signal is sent from first driving related system 111 to selection module 119.
3. RESET_SOC 403—reset a SOC of the first driving related system 111—without resetting the first FCMU 20(1). This signal is sent to first driving related system 111 from selection module 119.
4. RESET_FCMU 404—reset first FCMU 20(1). This signal is sent to first driving related system 111 from selection module 119.
5. ERROR_CR 411—indicative of a critical error of second driving related system 112. This signal is sent from second driving related system 112 to selection module 119.
6. ERROR_NCR 412—indicative of a non-critical error of second driving related system 112. This signal is sent from second driving related system 112 to selection module 119.
7. RESET_SOC 403—reset a SOC of the second driving related system 112—without resetting the second FCMU 20(2). This signal is sent to second driving related system 112 from selection module 119.
8. RESET_FCMU 404—reset second FCMU 20(2). This signal is sent to second driving related system 112 from selection module 119.

Figure 7:
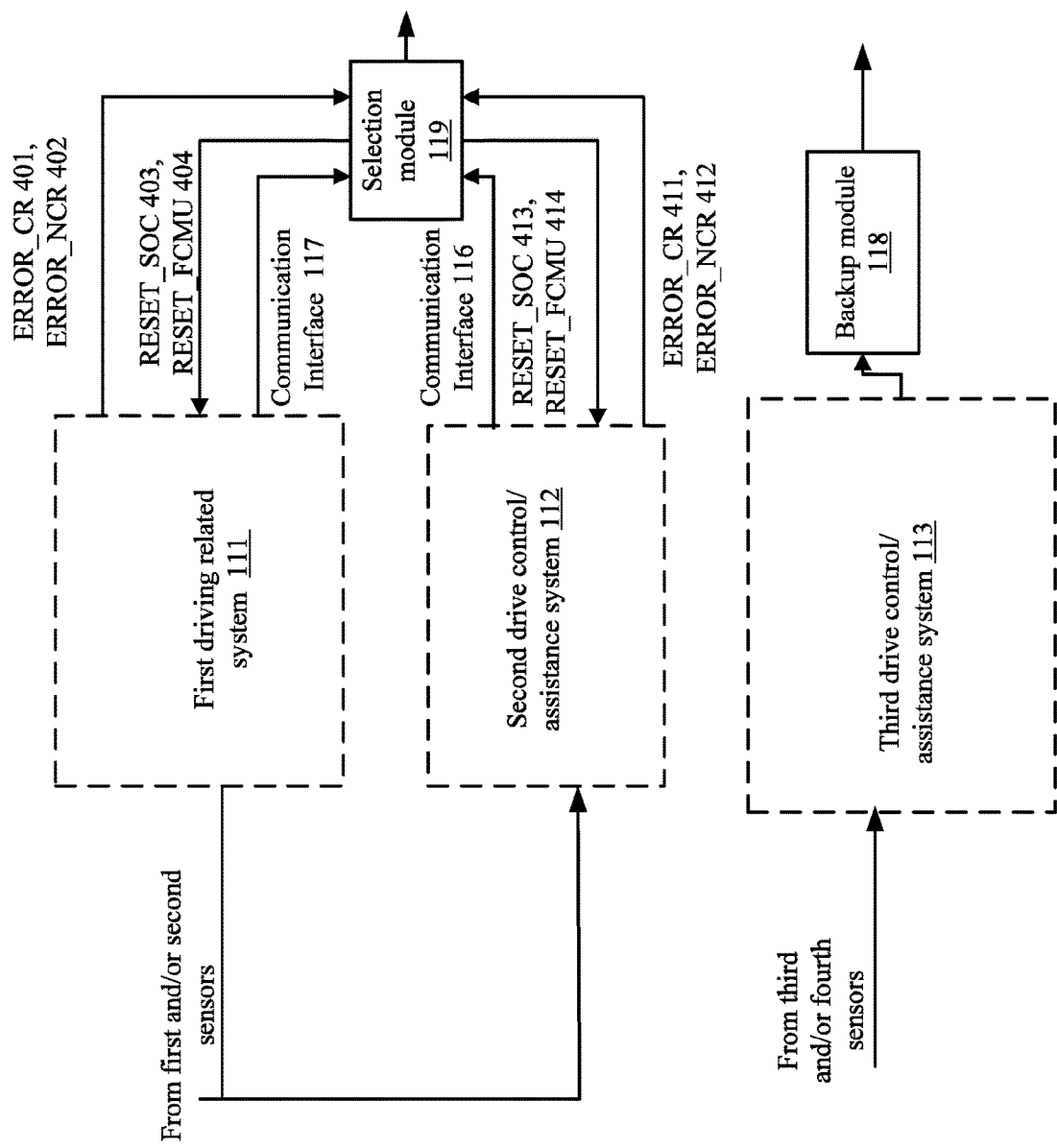
FIG. 7 illustrates an ADAS/AV system.

FIG. 7 illustrates system 100' in which each driving related system includes a single driving related module (not shown) that is fed by the first sensors and the second sensors.

Figure 8:
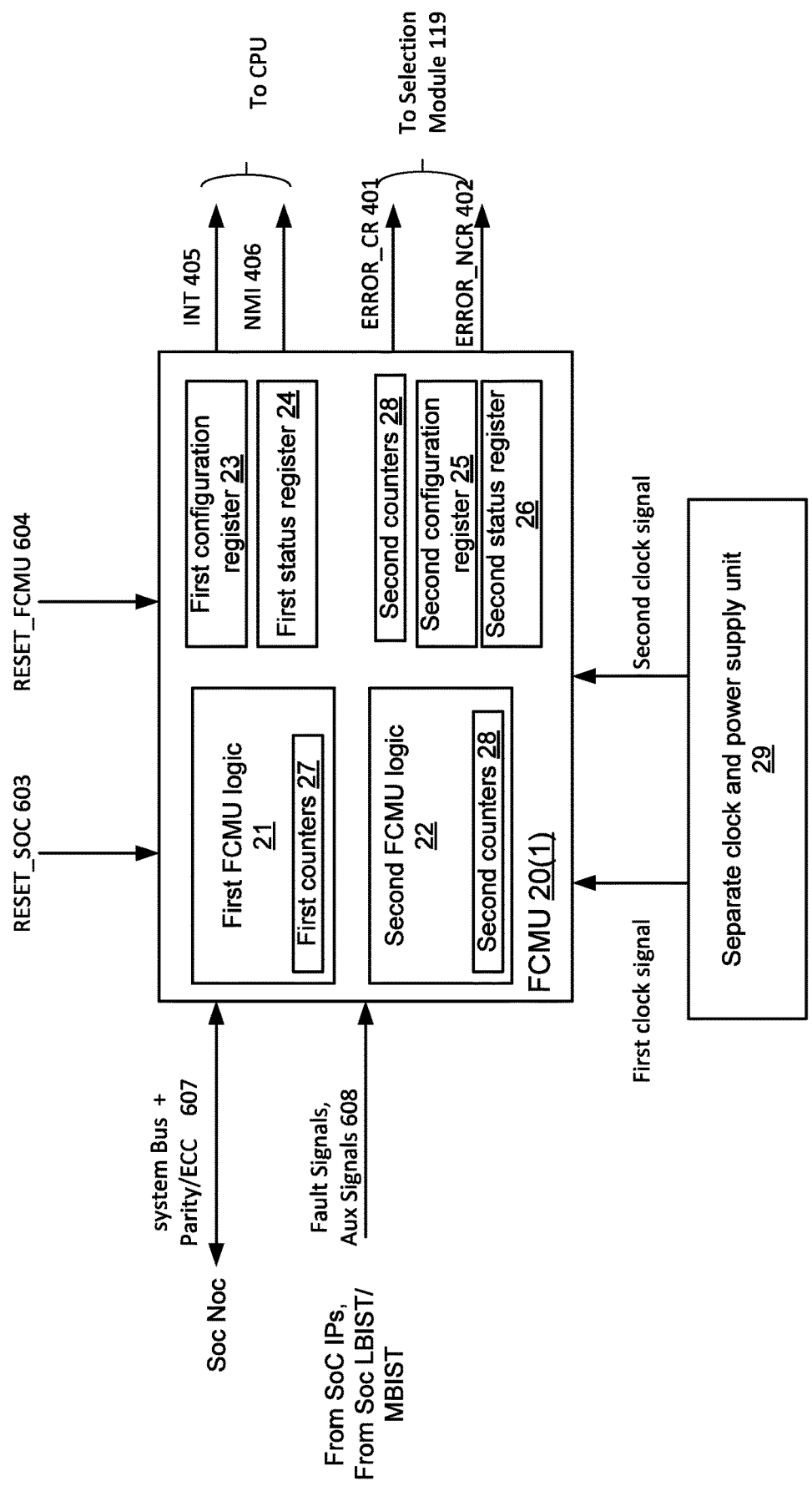
FIG. 8 illustrates a Fault Collection and Management Unit (FCMU) in SoC.

FIG. 8 illustrates an FCMU 20(1). It should be noted that FCMU 20(2) may have the same structure.

It is noted that the number and type of signals as well as the number and types of components (logics, registers) of an FCMU may differ from those illustrated in FIG. 8. For example—the FCMU may be fed by more than two different clock signals, there may be one, three or more duplicates of the components, and the like.

FCMU includes two ideally identical parts—each part may be fed by a different clock signal and operates independently from the other part. Independently generated and fed clocks signals are harder to tamper without detection by the FCMU. The status monitored by the two parts should be the same—mismatches between statuses reported by the different parts may indicate of a fault, breach or another error. The different parts may have different OPC ports and may generate different control signals. Each part includes an FCMU logic, configuration registers, status registers, and the like.

FCMU 20(1) includes two FCMU logics 21 and 22, first and second configuration registers 23 and 35, first and second status registers 24 and 26. FCMU 20(1) is fed by first and second clock signals. FCMU 20(1) may receive fault signals from any units/modules/circuits within each driving related module or within each driving related system and/or from external connected devices.

FCMU 20(1) may also receive fault signals from software running on internal CPU(s). Internal CPUs belong to a SOC.

FCMU 20(1) may receive a large number (even tens or hundreds—and even more) of fault and/or status signals and the large number of fault and/or status signals enables the FCMU to detect, log and report faults in a reliable and quick manner. The status registers may store sticky bits—that are indicative of a fault one a fault is detected and may be cleared only by power on reset or by software.

At least some of the registers of the FCMU may be password protected—thus programming one or more bits requires a reception of a password. The password may be stored in the FCMU. Programming will not be allowed if the wrong password is provided. This may guarantee that these bits are not programmed by error of in a malicious manner.

The first and second FCMU logics 21 and 22 receive the fault signals and determine whether to generate error signals such as ERROR_CR 401, ERROR_NCR 402, interrupt (INT) 405 and non-maskable interrupt (NMI) 406. These signals are provided as examples. The number and definition of such signals may be tailored to a particular application.

ERROR_CR 401 and ERROR_NCR 402 may be sent outside the driving related system—and to selection module 199. Interrupt signals INT 405 and NMI 406 are sent to a CPU of the SOC (an internal CPU).

The first and second FCMU logics 21 and 22 may include counters such as first counters 27 and second counters 28.

Fault counters may be used for both critical and non-critical faults. Non-critical faults may be treated as tolerable if (for example) they can be recovered from. However, if these faults reach a threshold then they may have severe impact on system performance and should be reported to a SOC CPU and/or external selection module. The fault counters count the number of faults (per each fault type).

Each one of the first and second FCMU logics may include one or more hardware components for implementing rules (that may be programmable and/or otherwise set) for monitoring faults (based on received fault signals (such as fault signals and/or auxiliary signals from various IPs, and/or such as parity and/or error correction code signals from the SOC) and/or based on tests executed by the FCMU itself) and for responding to the detected faults.

In FIG. 8 various fault signals are provided from built in self-test (BIST) modules (Soc LBIST, MBIST) of the driving related module and/or from the IPs (Soc IPs), and from external connected devices and from SW running on internal CPU(s). For example—faults signals 608 and auxiliary signals may be provided from SOC IPs and/or from LBIST and/or MBIST. The SOC NOC (interconnect) may provide system bus and parity/ECC signals 607.

SoC bus level interface such as OCP (and/or AXI, ACE, AHB, APB) and parity signals may be connected to the interconnect (Soc Noc) of the driving related module. These interfaces are used for accessing the FCMU control and status registers for the FCMU maintenance.

The rules may be stored in the FCMU, may be programmed to the FCMU, may change over time, may be fixed and the like.

For example, the rules may define an event and may determine whether the event represents a critical error, whether the event represents a non-critical error, whether the event requires interrupting a CPU of the driving related system, and the like.

An event may be defined when a certain fault occurs once, reoccurs at least a predefined number of times and/or reoccurs at least a predefined number of times within a time window.

Based on the rules, the FCMU may determine how to react—for example determine when to generate signals such as INT 405, MNI 406, ERROR_CR 401 and ERROR_NCR 402.

The first FCMU logic 21, first configuration register 23 and first status register 24 may be fed by the first clock while the second FCMU logic 22, second configuration register 25 and second status register 26 may be fed by the second clock.

The first and second status registers should reflect the current status of the first driving related system. The current status should reflect faults or an absence of faults.

The first and second configuration registers should reflect the desired configuration of the first driving related system—and this may represents one of more of the mentioned above rules. For example—a configuration may include a classification of critical and non-critical errors.

Yet for another example—the configuration registers may include threshold registers that are used to store the thresholds (per fault type) that once reached (reoccurrence of a fault type) should be regarded as an event—and thus should be reported to the selection module.

Using two different clocks from separate clock and power supply unit 29 may improve the robustness of the FCMU—and may increase its immunity to clock signal tamper attempts.

The content of the first and second configuration registers may be compared to each other to find errors (for example—a mismatch may be treated as an error). The content of the first and second status registers may be compared to each other to find errors (for example—a mismatch may be indicative of an error).

The first and second clock signals may be provided from a separate clock and supply unit 29. According to embodiments of the present disclosure, the FCMU is able to function and not be reset even when the other circuits of the driving related module are reset—and is fed by a different reset signal that the reset signal used to reset other components.

Furthermore—the FCMU may store statuses of other components (such as IPs of SOC) of the driving related system—including faults, such as after the other components of the driving related system, it is possible to find out which block led to the malfunction. The same applied to other components of the driving related modules—and even to the entire driving related module or system (when the FCMU is not included in the driving related system or module).

When a driving related module fails—the failure may be reported to selection module 119 or backup module 118 via error signals from the FCMU.

The selection module or backup module may request detailed information (related to failure) via some communication interface (for example SPI). It might be that this interface is not operational as a result of faults. In this case the Selection or backup module is capable to reset the SoC to restore its (and communication interface) functionality. FCMU keeps the log of faults regardless of such reset and so this log data may be reported via communication interface once it's again operational.

The selection module 119 includes selection circuitry for implementing response rules that determine how the selection module should respond to status reports, fault signals, and/or data provided by the driving related systems. The rules may be predefined, may change over time, may be fixed.

The selection module 119 may include a memory unit for storing the rules and the signals/reports/data from the driving related systems and a controller or processor for implementing the rules.

The selection module 119 may select to output signals from the more secure (fault free) driving related system—if such exists—and if the driving related system is currently secure. If all driving related systems are not secure—the selection module may select to reset (at least) these driving related systems. If all driving related systems are secure—the selection module may select a selected driving related system of which his signals are output by any manner—random, pseudo random, according to any order or rule.

FIG. 8 illustrates two reset signals RESET_SOC 603 and RESET_FCMU 604, according to embodiments of the present disclosure.

RESET_SOC 603 may be asserted with/without applying the power supply, it is reset for all the SoC logic and also FCMU SoC level bus interfaces. It does not reset the values of the FCMU status bits.

RESET_FCMU 604 may be asserted with/without applying the power supply, it is reset for the FCMU logic including status bits.

The response of the selection module 119 when receiving ERROR_CR from a certain FCMU or a certain driving related system may include:
1. Get a fault report from the certain driving related system (or certain FCMU) that send the ERROR_CR signal via the communication interface coupled to the certain driving related system.
2. If fault report is successfully received—assert RESET_SOC & RESET_FCMU that is sent to the certain driving related system or to the certain FCUM—and enter a safe state.
3. Else
    i. Assert RESET_SOC (reset SOC without FCMU) that is sent to the certain driving related system or to the certain FCUM.
    ii. Get a fault report via communication interface coupled to the certain driving related system.
    iii. Assert RESET_FCMU & RESET_SOC that is sent to the certain driving related system or to the certain FCUM.

It should be noted that the RESET_SOC and/or the RESET_SOC may also be sent to the FCMU and/or the driving related system that did not send the ERROR_CR signal.

The response of the selection module when receiving ERROR_NCR from a certain FCMU or a certain driving related system may include:
1. Get a fault report via communication interface that is coupled to the certain driving related system.
2. If successful—act per received status.
3. Else
    i. Assert RESET_SOC (reset SOC without FCMU) that is sent to the certain driving related system or to the certain FCUM.
    ii. Get a fault report via communication interface coupled to the certain driving related system.
    iii. Assert RESET_FCMU & RESET_SOC that is sent to the certain driving related system or to the certain FCUM.

The FCMU may serve as ASIL-D 'safety island' for Faults Logging and Report. This may be achieved, at least in part, by having a dedicated power supply such as separate clock and power supply unit 29.

It should be noted that the selection module 119 may select to output signals (for example output of the driving related system (such as processed data) from the driving related system that is more reliable (less faulty).

In this case the behavior would be:
i. IP asserts signal
ii. FCMU samples, filters, sends service request to selection module (e.g. ASIL-D MCU) and/or SOC CPU
iii. Selection module /CPU clear fault signal in source IP and then in FCMU (via Ctrl/Status register)

Critical faults may be immediately reported to selection module 119.

Each FCMU may get physical signal from IPs and reports to selection module 118 via ERROR_xxx pins.

Faults may be processed by FCMU on the rising edge of the fault signal—or in any other time.

Selection module 119 may also get full FCMU/IP status report via communication interfaces 116 and/or 117.

At some point (as early as possible) selection module 118 (via a communication interface) may clear the status bits in FCMU and IP, but meanwhile more faults of the same type might occur which are not reported (as status was not cleared yet).

The typical selection module 119 reaction to critical fault is SoC reset (RESET_SOC)

The backup module 118 may be used instead of the first or second driving related systems when the first and/or second driving related systems are faulty—especially suffer from critical errors.

Figure 9:
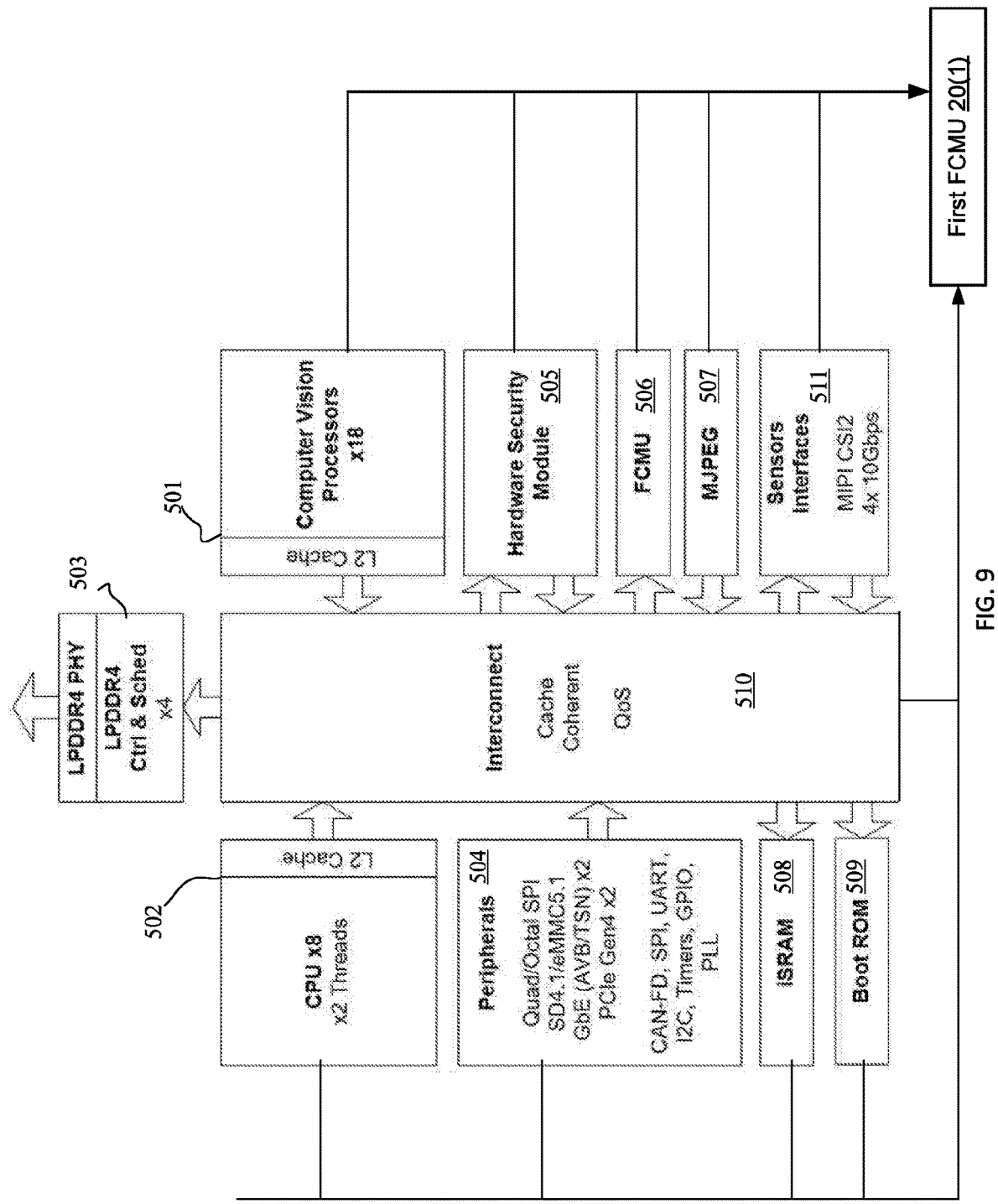
FIG. 9 illustrates an SoC system.

FIG. 9 illustrates a first driving related system that includes a SOC that includes a cache coherent interconnect 510 that is coupled to multiple IPs.

The multiple IPs include:
1. A first set of IPs 501 that includes computer vision processors (for example eighteen computer vision processors) that are coupled via a level two cache (L2 cache) to the cache coherent interconnect 510. Each computer vision processor performs image processing operations.
2. A second set of IPs that includes CPUs (for example eight CPUs) that are coupled via a level two cache (L2 cache) to the cache coherent interconnect 510.
3. A dynamic memory module interface 503 such as fourth generation low-power double data rate (LPDDR4) block.
4. Peripherals 504. The peripherals may include, for example Quad serial peripheral interface bus (SPI), Octal SPI, secure digital (SD4.1), embedded multimedia card (eMMC5.1), Gigabit Ethernet (GbE), audio video bridging time sensitive networking (AVB/TSN), PCI express (PCIe) fourth generation (Gen4), phase-lock loop (PLL), universal asynchronous receiver-transmitter (UART), general purpose input output (GPIO), Inter-integrated bus (I2C) and controlled area network with flexible data rate (CAN-FD), and the like.
5. Hardware security module 505.
6. FCMU 506.

7. Motion Joint Photographic Experts Group (MJPEG) unit 507.
8. ISRAM 508.
9. Boot ROM 509.
10. Sensors interface 511—such as sensor serial interface CSI2.

The IPs and the interconnect are coupled to FCUM 20(1) and may send FCMU 20(!) fault signals.

Non-limiting examples of fault signals (denoted 608 in FIG. 8) that may be sent from these IPs to the FCMU may include (the fault types provided below are examples, other types may be defined):
1. Integrity check fault. Indicates that an integrity error was detected by an IP
2. SRAM correctable data fault. Indicates one of the SRAM in the IP detected a correctable data error (i.e. ECC Single bit error that was corrected by the IP). This may be regarded as a non-critical fault.
3. SRAM uncorrectable data fault. Indicates one of the SRAM in the IP detected an uncorrectable data error (i.e. ECC detected more errors that can be corrected by the IP). This may be regarded as a critical fault.
4. SRAM uncorrectable address fault. Indicates one of the SRAM in the IP detected an uncorrectable address error. (i.e. ECC detected more errors that can be corrected by the IP). This may be regarded as a critical fault.
5. Data path fault. Indicates a parity error was detected by the IP in the data path.
6. Address path fault. Indicates a parity error was detected by the IP in the address path.
7. Configuration registers fault. Indicates a parity error was detected by the IP in the configuration registers.
8. Status Register Fault. Indicates a parity error was detected by the IP in the status registers.
9. Transaction time-out (internal interface, e.g. OCP/AXI/AHB etc.). Indicates a transaction timeout error was detected by the IP.
10. Protocol Fault (external interface, e.g. PCIe, Ethernet, SPI etc.). Indicates a protocol error was detected by the IP.
11. Address violation fault. Indicates an address access violation was detected by the IP.
12. LBIST (Logic Built In Self-Test) Fault. LBIST was run on one of the accelerators or cores and returned a FAIL to the CPU, which raises an LBIST Fault by software.
13. MBIST (Memory Built In Self-Test) Fault. MBIST Fault—MBIST was run on one of the embedded memories and returned a FAIL to the CPU, which raises an MBIST Fault by software.

The mentioned above fault signals may be defined (in a secure manner that is hard to change as critical faults or non-critical faults).

The FCMU may receive the following Auxiliary Signals:
1. Interrupt/Reset from WatchDog Timer. An interrupt/request sent by a watchdog timer—indicating an expiration of a predefined period without an occurrence of a predefined action.
2. Security violation events—an event upon which the hardware security module alerts the CPU of a potential security threat, for example, authentication failure.

The fault signals may be semi-static. A fault signals may be semi-static in the sense that it may be set to a certain level following a detection of a fault but may be reset to another level (indicating that the fault does not exist) only by authorized entities such as the FCMU itself.

FIG. 9 illustrates a system on chip that may be any of the first till sixth driving related modules according to an embodiment of the invention.

Figure 10:
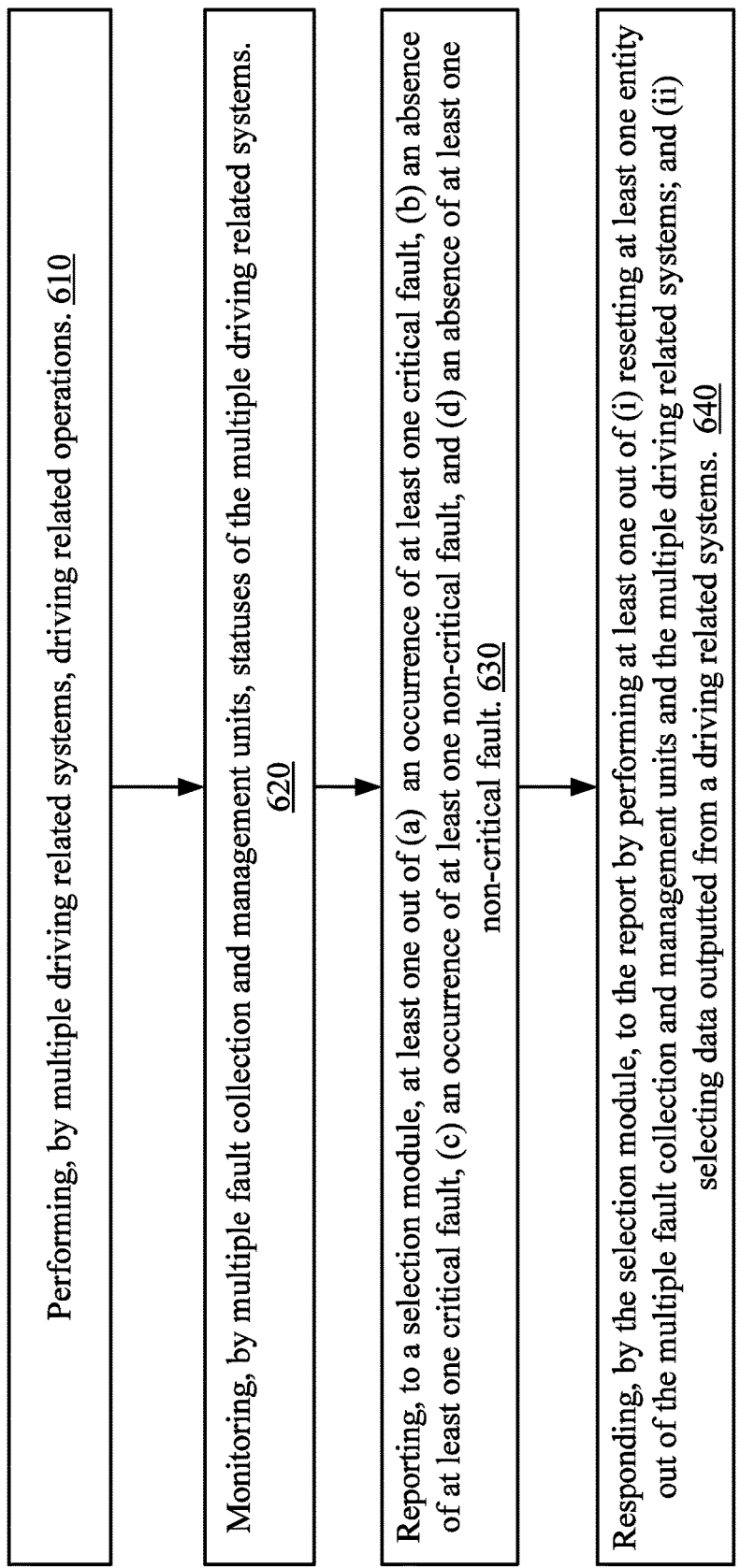
FIG. 10 illustrates a method.

FIG. 10 illustrates method 600.

Method 600 is for securing a system.

Method 600 includes the following steps:

Step 610 of performing, by multiple driving related systems, driving related operations.

Step 620 of monitoring, by multiple fault collection and management units, statuses of the multiple driving related systems.

Step 630 of reporting, to a selection module, at least one out of (a) an occurrence of at least one critical fault, (b) an absence of at least one critical fault, (c) an occurrence of at least one non-critical fault, and (d) an absence of at least one non-critical fault.

Step 640 of responding, by the selection module, to the report by performing at least one out of (i) resetting at least one entity out of the multiple fault collection and management units and the multiple driving related systems; and (ii) selecting data outputted from a driving related systems.

The reset allows to recover from errors and the selection of data is made in order to provide data that is deemed more reliable—from a more reliable driving related system.

Step 640 may include at least one out of:
1. Resetting, by the selection module, a certain driving related system following an occurrence of a critical fault related to the certain driving related system without resetting a certain fault collection and management unit that is associated with the certain driving related system. This may occur, for example, if the certain fault collection and management unit seems to function properly—for example—is not faulty.
2. Resetting, by the selection module, a certain driving related system and a certain fault collection and management unit that is associated with the certain driving related system following the occurrence of a critical fault related to the certain driving related system. This may occur, for example, if the certain fault collection and management unit seems to malfunction—for example—is faulty.
3. Resetting, by the selection module, a faulty fault collection and management unit.
4. Resetting, by the selection module, a faulty fault collection and management unit and a driving related system associated with the faulty fault collection and management unit.
5. Resetting, by the selection module, a certain driving related system following a reoccurrence, for at least a predetermined number, of a non-critical fault related to the certain driving related system without resetting a certain fault collection and management unit that is associated with the certain driving related system.
6. Resetting, by the selection module, a certain driving related system following a reoccurrence, for at least a predetermined number, of a non-critical fault related to the certain driving related system and reset a certain fault collection and management unit that is associated with the certain driving related system.

Step 640 may include determining that a fault collection and management unit is faulty or not. Each fault collection and management unit may include multiple parts that are identical to each other.

Step 640 may include feeding each part by a dedicated clock signal, and determining, by each part, a status of a driving related system that is associated with the fault collection and management unit. This determining may include comparing, by the fault collection and management unit, between statuses determined by the multiple parts to detect mismatches indicative of a faulty collection and management unit.

Method 600 may include feeding an additional driving related system by sensors that differ from the sensors that feed the multiple driving related systems.

Each of the multiple driving related systems comprises a single system on chip.

Each of the multiple driving related systems include multiple driving related modules. Method 600 may include feeding the different driving related modules by different sensors.

Any reference to a system should be applied, mutatis mutandis to a method that is executed by a system and/or to a computer program product that stores instructions that once executed by the system will cause the system to execute the method. The computer program product is non-transitory and may be, for example, an integrated circuit, a magnetic memory, an optical memory, a disk, and the like.

Any reference to method should be applied, mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including", "comprising", "having", "consisting" and "consisting essentially of" are used in an interchangeable manner For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one " and "one or more " in the claims should not be construed to imply that the introduction of another claim element by the indefinite articles "a " or "an " limits any particular claim containing such introduced claim element to inventions containing only one such element, even when the same claim includes the introductory phrases "one or more " or "at least one " and indefinite articles such as "a " or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided.

Any combination of any system illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A system that comprises:
multiple driving related systems that are configured to perform driving related operations;
selection circuitry; and
multiple fault collection and management units that are configured to monitor statuses of the multiple driving related systems and to report, to the selection circuitry, at least one out of (a) an occurrence of at least one critical fault, (b) an absence of at least one critical fault, (c) an occurrence of at least one non-critical fault, and (d) an absence of at least one non-critical fault;
wherein the selection circuitry differs from the multiple fault collection and management units and is coupled to the multiple fault collection and management units, and wherein the selection circuitry is configured to respond to the report by determining whether to reset at least one entity out of the multiple fault collection and management units,
and in response to determining to reset, resetting the at least one entity out of the multiple fault collection and management units by sending one or more reset signals, wherein the one or more reset signals reset the at least one entity of the multiple fault collection and management units, and wherein the response to the determining to reset does not comprise resetting the selection circuitry.

2. The system according to claim 1 wherein the selection circuitry is configured to reset a certain driving related system following an occurrence of a critical fault related to the certain driving related system without resetting a certain fault collection and management unit that is associated with the certain driving related system.

3. The system according to claim 1 wherein the selection circuitry is configured to reset a certain driving related system and a certain fault collection and management unit that is associated with the certain driving related system following the occurrence of a critical fault related to the certain driving related system.

4. The system according to claim 1 wherein the selection circuitry is configured to reset a faulty fault collection and management unit and a driving related system associated with the faulty fault collection and management unit.

5. The system according to claim 1 wherein the selection circuitry is configured to reset a certain driving related system following a reoccurrence, for at least a predetermined number of reoccurrences, of a non-critical fault related to the certain driving related system without resetting a certain fault collection and management unit that is associated with the certain driving related system.

6. The system according to claim 1 wherein the selection circuitry is configured to reset a certain driving related system following a reoccurrence, for at least a predetermined number of reoccurrences, of a non-critical fault related to the certain driving related system and reset a certain fault collection and management unit that is associated with the certain driving related system.

7. The system according to claim 1 wherein each fault collection and management unit comprises multiple parts that are identical to each other, each part is fed by a dedicated clock signal and is configured to determine a status of a driving related system that is associated with a fault collection and management unit.

8. The system according to claim 7 wherein the fault collection and management unit is configured to compare between statuses determined by the multiple parts to detect mismatches indicative of a faulty collection and management unit.

9. The system according to claim 1 further comprising an additional driving related system and backup circuitry;
wherein the additional driving related system is fed by sensors that differ from the sensors that feed the multiple driving related systems.

10. The system according to claim 1 wherein each of the multiple driving related systems comprises a single system on chip.

11. The system according to claim 1 wherein each of the multiple driving related systems comprises multiple driving related modules;
wherein different driving related modules are fed by different sensors.

12. The system according to claim 1 wherein data outputted from the multiple driving related systems is generated by processing, by the multiple driving related systems, signals generated by the same sensors.

13. The system according to claim 1 wherein the one or more reset signals comprise (a) a first reset signal for resetting a first fault collection and management unit of the multiple fault collection and management units, and (b) a second reset signal for resetting a second fault collection and management unit of the multiple fault collection and management units.

14. The system according to claim 13 wherein the selection circuitry is configured to reset a first driving related system of the multiple driving related systems following an occurrence of a critical fault related to the first driving related system without resetting the first fault collection and management unit by sending a third reset signal; and wherein the selection circuitry is configured to reset a second driving related system of the multiple driving related systems following an occurrence of a critical fault related to the second driving related system without resetting the second fault collection and management unit by sending a fourth reset signal, wherein the first fault collection and management unit is associated with the first driving related system and the second fault collection and management unit is associated with the second driving related system.

15. A method for securing a system, the method comprising:
performing, by multiple driving related systems, driving related operations;
monitoring, by multiple fault collection and management units, statuses of the multiple driving related systems;
reporting, to selection circuitry, at least one out of (a) an occurrence of at least one critical fault, (b) an absence of at least one critical fault, (c) an occurrence of at least one non-critical fault, and (d) an absence of at least one non-critical fault, wherein the selection circuitry differs from the multiple fault collection and management units and is coupled to the multiple fault collection and management units;
responding, by the selection circuitry, to the report by determining whether to reset at least one entity out of the multiple fault collection and management units; and
in response to determining to reset, resetting at least one entity out of the multiple fault collection and management units and the multiple driving related systems by sending one or more reset signals, wherein the one or more reset signals reset the at least one entity of the multiple fault collection and management units, and wherein the response to the determining to reset does not comprise resetting the selection circuitry.

16. The method according to claim 15 comprising resetting, by the selection circuitry, a certain driving related system following an occurrence of a critical fault related to the certain driving related system without resetting a certain fault collection and management unit that is associated with the certain driving related system.

17. The method according to claim 15 comprising resetting, by the selection circuitry, a certain driving related system and a certain fault collection and management unit that is associated with the certain driving related system following the occurrence of a critical fault related to the certain driving related system.

18. The method according to claim 15 comprising resetting, by the selection circuitry, a faulty fault collection and management unit and a driving related system associated with the faulty fault collection and management unit.

19. The method according to claim 15 comprising resetting, by the selection circuitry, a certain driving related system following a reoccurrence, for at least a predetermined number of reoccurrences, of a non-critical fault related to the certain driving related system without resetting a certain fault collection and management unit that is associated with the certain driving related system.

20. The method according to claim 15 comprising resetting, by the selection circuitry, a certain driving related system following a reoccurrence, for at least a predetermined number of reoccurrences, of a non-critical fault related to the certain driving related system and reset a certain fault collection and management unit that is associated with the certain driving related system.

21. The method according to claim 15 wherein each fault collection and management unit comprises multiple parts that are identical to each other, wherein the method comprises feeding each part by a dedicated clock signal, and determining, by each part, a status of a driving related system that is associated with a fault collection and management unit.

22. The method according to claim 21 comprising comparing, by the fault collection and management unit, between statuses determined by the multiple parts to detect mismatches indicative of a faulty collection and management unit.

23. The method according to claim 15 comprising feeding an additional driving related system by sensors that differ from the sensors that feed the multiple driving related systems.

24. The method according to claim 15 wherein each of the multiple driving related systems comprises a single system on chip.

25. The method according to claim 15 wherein each of the multiple driving related systems comprises multiple driving related modules;
wherein different driving related modules are fed by different sensors.

26. The method according to claim 15 wherein data outputted from the multiple driving related systems is generated by processing, by the multiple driving related systems, signals generated by the same sensors.

27. A non-transitory computer program product that stores instructions for performing the operations comprising:
performing, by multiple driving related systems, driving related operations;
monitoring, by multiple fault collection and management units, statuses of the multiple driving related systems;
reporting, to selection circuitry, at least one out of (a) an occurrence of at least one critical fault, (b) an absence of at least one critical fault, (c) an occurrence of at least one non-critical fault, and (d) an absence of at least one non-critical fault, wherein the selection circuitry differs from the multiple fault collection and management units and is coupled to the multiple fault collection and management units;
responding, by the selection circuitry, to the report by determining whether to reset at least one entity out of the multiple fault collection and management units, and, in response to determining to reset, resetting at least one entity out of the multiple fault collection and management units by sending one or more reset signals, wherein the one or more reset signals reset the at least one entity of the multiple fault collection and management units, and wherein the response to the determining to reset does not comprise resetting the selection circuitry.

* * * * *